United States Patent [19]

Younes

[11] Patent Number: 4,709,002

[45] Date of Patent: Nov. 24, 1987

[54] METHOD FOR THE PREPARATION OF RIGID NON-CELLULAR REACTION INJECTION MOLDED THERMOSET POLYISOCYANURATE COMPOSITIONS

[75] Inventor: Usama E. Younes, Newtown Square, Pa.

[73] Assignee: Atlantic Richfield Company, Los Angeles, Calif.

[21] Appl. No.: 871,003

[22] Filed: Jun. 5, 1986

[51] Int. Cl.[4] .................... C08G 18/08; C08G 18/18; C08J 75/00
[52] U.S. Cl. ...................................... 528/53; 528/48; 524/871; 524/712; 524/724
[58] Field of Search .................... 528/48, 53; 524/712, 524/724, 871

[56] References Cited

U.S. PATENT DOCUMENTS

| 3,703,520 | 11/1972 | Carleton et al. | 528/52 |
| 3,840,578 | 10/1974 | Hennig | 524/871 |
| 3,878,156 | 4/1975 | Olstowski et al. | 524/732 |
| 3,883,466 | 5/1975 | Olstowski | 524/729 |
| 3,886,102 | 5/1975 | Olstowski | 524/712 |
| 4,035,331 | 7/1977 | Olstowski | 524/237 |
| 4,456,745 | 6/1984 | Rajan | 528/48 |

Primary Examiner—John Kight
Assistant Examiner—Dennis R. Daley
Attorney, Agent, or Firm—Delbert E. McCaslin

[57] ABSTRACT

A method for the preparation of a molded reaction injection molded rigid non-cellular polyisocyanurate polymer composition by injecting at least two streams into the mold cavity of a RIM machine to react at temperatures of from about ambient to about 140° C. a formulation comprising at least one stream of an organic di- or polyisocyanate and in a second stream a cyclic alkylene carbonate and a soluble adduct of a tertiary amine and a cyclic alkylene carbonate as catalyst.

10 Claims, No Drawings 4,709,002

METHOD FOR THE PREPARATION OF RIGID NON-CELLULAR REACTION INJECTION MOLDED THERMOSET POLYISOCYANURATE COMPOSITIONS

FIELD OF THE INVENTION

This invention relates to a method for the preparation of rigid non-cellular reaction injection molded polyisocyanurate thermoset polymer compositions by injecting at least two streams into a cavity of a reaction injection molding (RIM) machine.

BACKGROUND OF THE INVENTION

The preparation of reaction injection molded elastomers such as polyurethane foamed products with release agents is known and has become popular for the preparation of automobile body parts and other applications (See U.S. Pat. No. 4,420,570). Generally the commercial RIM machines are of the two stream variety to prepare the foamed products, however three, four or more may be employed.

The preparation of polyisocyanurate foams using a wide variety of trimerization catalysts has been suggested and used (See for example U.S. Pat. No. 4,033,908 and references cited therein).

U.S. Pat. Nos. 3,878,156, 3,883,466 and 3,886,102 all describe the preparation of rigid non-cellular polyurethane compositions from polyether polyols, isocyanates, organic carbonates and non-amine containing metallic catalyst.

U.S. Pat. No. 4,035,331 discloses a rigid non-cellular polyurethane composition using an amine initiated polyol an isocyanate and a liquid modifier of an organic carbonate.

U.S. Pat. No. 3,703,520 describes the preparation of an insoluble trimerization adduct catalyst of ethylene carbonate and triethylene diamine.

SUMMARY OF THE INVENTION

According to the present invention there is provided an improved method of making a rigid non-cellular RIM polyisocyanurate thermoset polymer composition which comprises injecting at least two streams via a RIM machine into a mold cavity of desired configuration to react at temperatures of from about ambient to about 140° C. a formulation comprising at least one stream of an organic di- or polyisocyanate and in a second stream from about 5 to about 50 parts by weight of a cyclic alkylene carbonate based on the isocyanate-carbonate composition, and a soluble adduct of a tertiary amine and a cyclic alkylene carbonate at a concentration of from about 0.01 to about 5.0 weight percent based on the total composition as catalyst.

It is a primary object of this invention therefore, to provide an improved method for the preparation of a rigid non-cellular polyisocyanurate thermoset composition having improved properties via a reaction in3ection molding (RIM) machine.

It is another object of this invention to provide a polyisocyanurate RIM composition which at 100° C. will provide 10 times the release from the mold than the regular prior art RIM urethanes using external mold release agent.

These and other objects and advantages of this invention will become apparent from the description of the invention and from the claims.

DETAILED DESCRIPTION OF THE INVENTION

In accordance with the present invention, rigid non-cellular polyisocyanurate thermoset polymer compositions are prepared by reaction injection molding by injecting at least two streams into the mold cavity of a RIM machine of desired configuration to react at temperatures of from about ambient to about 140° C. a formulation comprising at least one stream of an organic di- or polyisocyanate and in a second stream from about 5 to about 50 and preferably from about 20 to about 35 parts by weight of a cyclic alkylene carbonate, based on the isocyanate-carbonate composition, and an essentially fully aged soluble adduct of a tertiary amine and a cyclic alkylene carbonate at a concentration of from about 0.01 to about 5.0 and preferably from about 0.02 to about 0.2 weight percent based on the total composition as catalyst.

A wide variety of organic isocyanates including aliphatic, alicyclic and aromatic polyisocyanates may be employed in the instant invention and are characterized by containing two or more isocyanate (NCO) groups per molecule. Typical organic di- or polyisocyanates include p-phenylene diisocyanate, polymethylene polyphenyl isocyanate, toluene-2,4- and 2,6-diisocyanate or mixtures thereof, dianisidine diisocyanate, hexamethylene diisocyanate, naphthalene-1,4-diisocyanate, naphthalene-1,4-diisocyanate, octylene-1,8-diisocyanate, 4,4'-diphenylpropane diisocyanate, 3,3'-dimethyl diphenylmethane-4,4'-diisocyanate, triphenylmethane triisocyanate,3,3'-ditolylene-4,4'-diisocyanate, 4-chloro-1,3-phenylene diisocyanate 1,4-,1,3-and 1,2-cyclohexylene diisocyanate and in general the isocyanates disclosed in U.S. Pat. No. 3,577,358. Mixtures of polyisocyanates may be used which for example are the crude mixtures of di- and higher functional polyisocyanates produced by phosgenation of aniline-formaldehyde condensates or as prepared by the thermal decomposition of the corresponding carbamates dissolved in a suitable solvent as described in U.S. Pat. Nos. 3,962,302 and 3,919,279, both known as crude MDI or PMDI. Known processes for the preparation of polyamines and corresponding methylene bridged polyphenyl polyisocyanates therefrom are disclosed in the literature and in many patents; for example U.S. Pat. Nos. 2,683,730, 2,950,263, 3,012,008, 3,334,162 and 3,362,979. The isocyanates may contain impurities or additives such as the carbodiimides or uretonimine modified MDI products. The preferred polyisocyanates are the diphenylmethane diisocyanate 2,4' and 4,4' isomers including the 2,2' isomer and the higher functional polyisocyanate polymethylene polyphenyl isocyanate mixtures, which may contain from about 20 to about 85 weight percent of the diphenylmethane diisocyanate isomers. Typical of the preferred polyisocyanates are those sold commercially as "Isonate 143-L" by the Upjohn Company a carbodiimide mocified diphenylmethane diisocyanates, "Rubinate-M" (Rubicon Chemical Inc.) and similar diisocyanates. The amount of isocyanate employed in the RIM process will be from about 95 to about 50 and preferably from about 80 to about 65 parts by weight based on the isocyanate-alkylene carbonate ingredients in the formulation.

The cyclic alkylene carbonates employed in the present invention in amounts of from about 5 to about 50 preferably from about 20 to about 35 parts by weight based on the isocyanate-carbonate composition have the general

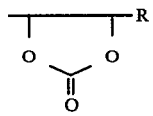

hydrogen, $CH_3$, $C_2H_5$ or $C_3$ to $C_{10}$ hydrocarbons. Typical cyclic alkylene carbonates include, for example, ethylene carbonate, propylene carbonate, butylene carbonate, styrene carbonate and octylene carbonate, mixtures thereof and the like. Liquid alkylene carbonates are preferred, however, solid or semi-solid carbonates may be used if liquified with other liquid alkylene carbonates or by the reaction temperature at which they are employed. Propylene carbonate is the preferred cyclic alkylene carbonate. Some of the alkylene carbonate may be added, in the RIM injection process, along with and mixed with the isocyanate in order to reduce viscosity if desirable.

The catalysts employed in the instant invention for formation of the polyisocyanurate polymer are trimerization catalysts and are soluble complex adducts of a reaction of a tertiary amine and the cyclic alkylene carbonates as set forth hereinabove. The preferred catalyst is an adduct of triethylene diamine (DABCO) and propylene carbonate. In order for the catalysts of the instant invention to provide optimum RIM results i.e., catalyze the RIM reaction in 2 minutes or less, they should be essentially fully aged for periods of from about 1 hour to about 90 days which time period will be dependent on the given catalyst concentration and aging temperature. Aging at ambient temperatures may be employed and would generally be about 12 hours at, for example, a concentration of about 0.5 weight percent. Lesser periods would be realized at higher temperatures e.g. about 40° C. to about 120° C. and/or at increased concentrations.

The tertiary amines which may be employed to form the complex adduct catalysts include, for example, N-methyl morpholine, N-ethyl morpholine, dimethylaminocyclohexane, triethylenediamine, bis(dimethylaminoethyl) ether, dimethylethanolamine, 1,4-dimethylpiperazine, trimethylaminopropylethanolamine, trimethylhydroxyethyl ethylenediamine, N,N,N', N'-tetramethyl ethylene diamine and the like.

Although not essential for the practice of this invention, the use of commonly known additives which may enhance color or properties of the polyisocyanurate rigid polymer may be used if desired. For example, reinforcing materials known to those skilled in the art such as chopped or milled glass fibers, chopped or milled carbon fibers and/or other mineral fibers may be useful.

Although excellent mold release is obtained with the RIM formulation of the instant invention alone, external or internal mold release agents such as for example the dimethyl siloxanes with organic acid groups may be used.

The present invention is more fully illustrated by the following examples, which include particular features of the invention. However, the examples are not to be construed as limiting the invention in any way, it being understood that numerous variations are possible without departing from the spirit and scope of the invention.

EXAMPLE I

The following formulation was reaction injection molded on a Martin Sweets "Flexamatic HP-206" RIM machine into an aluminum mold $8'' \times 8'' \times \frac{1}{8}''$.

| Component A | Component B |
| --- | --- |
| Carbodiimide Modified Diphenylmethane Diisocyanate ("Isonate-143L") | Propylene Carbonate 99.5% Triethylene Diamine (DABCO) 0.5% |

Component B was allowed to stand (age) for a 24 hour period to form an amine-carbonate adduct. A ratio of 56.0:44.0 parts by weight of component A (MDI) to component B was impingement mixed and the sample was demolded in about 1 minute. The formed polyisocyanurate was then postcured for 2 hours at 120° C. Testing of the material with an "Instron" gave a tensile strength and Young's Modulus of 3310 psi and 113750 psi respectively as well as an Izod impact strength of 0.26 ft lbs./in. and a Shore D-hardness of 70.

EXAMPLE 2

The procedure of Example I was repeated using 70.0 parts by weight of component A and 30.0 parts by weight of component B. The materials were impingement mixed into the mold and the sample demolded in about 1 minute and then postcured for 2 hours at 120° C. Testing of the resulting molded polyisocyanurate gave a tensile strength of 5010 psi, Young's Modulus of 165,000 psi, flex strength of 6870 psi, flex modulus of 181,050 psi, a notched Izod impact strength of 0.4 ft-lbs/in, a Shore D-hardness of 75 and a heat distortion temperature of 147° C. by DMA.

EXAMPLE 3

The same 70.0 parts by weight of component A and 30.0 parts by weight of component B as in Example 2 was impingement mixed into the mold which has a woven glass mat placed into it. The final polyisocyanurate molded polymer contained 40% glass by weight. Testing of the material gave the following properties: Tensile Strength = 10200 psi, Young's Modulus = 403,100 psi, Flex Strength = 10,000 psi, Flex Modulus = 316,510 psi, Notched Izod = 13.9 ft-lbs/in., Shore D-Hardness = 79, and a Heat Distortion Temperature of 167° C.

EXAMPLE 4

Preparation of the soluble tertiary amine-propylene carbonate adduct trimerization catalyst as used in the instant invention 5.5 gm of triethylene diamine (DABCO) was dissolved in 558.4 gm of propylene carbonate ("ARCONATE" 5000 sold by ARCO Chemical division of Atlantic Richfield Co.) and the solution allowed to stand at room temperature for approximately 500 hours (to form the adduct and age the mixture), at which time a dark brown catalyst solution was obtained. The activity of the catalyst as a function of aging was demonstrated by measuring the set time at ambient temperature of ~25° C. of a 70:30 parts by weight mixture of MDI ("Isonate 143L") and 0.1% of the catalyst solution in propylene carbonate.

| Catalyst Age (hrs.) | Set Time (minutes) |
| --- | --- |
| 0 | No set for 2,000 hrs. |
| 21.5 | 1500 |
| 45.5 | 900 |
| 69.5 | 240 |
| 94.5 | 13.6 |
| 190.5 | 6.0 |
| 220.5 | 4.5 |
| 268.5 | 3.3 |
| 335.5 | 3.2 |
| 507.5 | 2.0 |
| 671.5 | 1.5 |

EXAMPLE 5

The following example demonstrates the use of high purity MDI modified with difunctional adducts (Sold commercially as "Isonate 181 " by the Upjohn Company) in the preparation of a RIM polyisocyanurate composition.

| Component A | Component B |
| --- | --- |
| MDI ("Isonate 181") 100% | Propylene Carbonate 66.7% |
| | 0.5% DABCO in propylene carbonate (aged 79 days) 33.3% |

Component A and component B were mainained at a temperature of 45° C. and 30° C. respectively. The mold temperature was maintained at 50° C. A ration of 74.0:26.0 parts by weight of components A to B were impingement mixed into the RIM machine and the material demolded in about 1 minute. After postcuring for 2 hours at 120° C. tests of the polisocyanurate gave the following properties: Tensile strength of 6980 psi, flexural moldulus of 230,000 psi and a deflection temperature under load (DTUL) of 131° C. at 264 psi.

EXAMPLE 6

The procedure of Example 5 was repeated employing the same type of composition with the exception that three pre-cut mats of a continuous strand woven glass mats were preplaced in a 8"×8"×⅛" aluminum mold. The mold was heated to 50° C. and a ratio of 74.0:26.0 parts by weight of components A to B were impingement mixed into the mold. The sample was demolded in about 1 minute. The final polyisocyanurate rigid material contained 30.6% glass. After postcuring at 120° C. for 2 hours, testing of the material gave the following properties. Tensile strength of 23,000 psi, flex modulus of 907,000 psi, Izod impact of 22 ft-lbs/in and a DTUL of 187° C. at 264 psi.

EXAMPLE 7

A 5% solution of N,N,N'N'-tetramethyl ethylene diamine in propylene carbonate was prepared and the solution allowed to age at 60° C. for 21 hours, at which time a darkening of the solution was observed indicating formation of the active catalyst adduct.

This catalyst solution was compared to a freshly prepared N,N,N'N'-tetramethyl ethylene diamine with no aging in a RIM formulation, following the procedure of Example 1, with 70% MDI ("Isonate 143L"), 20% propylene carbonate, and 10% of the 5% catalyst adduct solution (concentration 0.5% of total composition). The reactivity results showed no set time for the fresh non-aged solution and a set time of 0.85 minutes for the 21 hour aged catalyst solution.

EXAMPLE 8

35 g. MDI ("Isonate 143L"), 14 g ethylene carbonate and 1g of a 5% solution of a 24 hour aged N,N,N',N'-tetramethyl ethylene diamine in propylene carbonate (0.1% catalyst concentration of total composition) were impingement mixed in a RIM machine at 60° C. The solution set in about 0.65 minutes to give a solid non-cellular polyisocyanurate polymer.

EXAMPLE 9

This example demonstrates the use of low catalyst concentrations to prepare the polyisocyanurate polymer by reaction injection molding following the procedure of Example I.

A 70:30 parts by weight ratio of MDI ("Isonate 143L") to propylene carbonate and 0.01 weight percent of various aged catalyst solutions (1% DABCO in propylene carbonate) was impingement mixed in a RIM machine. The set time results in minutes at ambient (22° C.) and at 80° C. were as follows:

| Temp. °C. | Set Time (min.) Aged 936 hrs. | Set Time (min.) Aged 144 hrs. |
| --- | --- | --- |
| 22 | 77.0 | >100 |
| 80 | 3.1 | 55.9 |

EXAMPLE 10

This Example demonstrates the mold release characteristics of a 70:30 weight percent ratio of MDI ("Isonate 143L") to propylene carbonate as compared to a standard polyurethane RIM formulation at three different mold temperatures.

The experiments were conducted using 5"×5"aluminum molds. The two materials compared were (1) a 70:30 weight percent mixture of MDI (Isonate 143L") to propylene carbonate to which was added 0.1 weight % DABCO-propylene carbonate catalyst complex and (2) a urethane formulation consisting of 40 weight percent MDI ("Isonate 143L"), 52.6 weight percent of an ethylene oxide terminated polyether polyol ("Plurical 380"sold commercially by BASF Wyandotte Corp.), 7.4 weight percent ethylene glycol with 0.02 phr dibutytin dilaurate and 0.44 phr triethylene diamine (DABCO) catalysts.

The aluminum molds were initially sprayed with a silicone mold release agent. The two thermoset materials were poured into each of the molds and the moldings repeated until sticking to the mold occurred. The results were as follows:

| Mold Temp. °C. | No. of Releases (1)Isocyanate-Carbonate | No. of Releases (2)Urethane |
| --- | --- | --- |
| 25 | 1 | 1 |
| 80 | 4 | 1 |
| 100 | 10 | 1 |

There is a pronounced improvement of the isocyanate-carbonate formulation over the polyurethane formulation expecially at the higher mold temperatures of 100° C.

I claim:

1. A method for the preparation of rigid non-cellular reaction injection molded polyisocyanurate thermoset polymer composition which comprises injecting at least two steams via a RIM machine into a mold cavity of the desired configuration to react at temperatures of from about ambient to about 140° C. a reaction mixture comprising at least one stream of an organic di-or polyisocyanate and a second stream of from about 5 to about 50 parts by weight of a cyclic alkylene carbonate, based on 100 parts of the isocyanate-carbonate composition, in the presence of a soluble adduct of a tertiary amine and a cyclic alkylene carbonate as catalyst at a concentration of from about 0.01 to about 5.0 weight percent based on the total composition.

2. A method according to claim 1 wherein the cyclic alkylene carbonate is employed in an amount of from about 20 to about 35 parts by weight.

3. A method according to claim 1 wherein the adduct is employed at a concentration of from about 0.02 to about 0.2 weight percent.

4. A method according to claim 1 wherein the organic di- or polyisocyanate is diphenylmethane diisocyanate.

5. A method according to claim 4 wherein the diphenylmethane diisocyanate is carbodiimide modified.

6. A method according to claim 1 wherein the alkylene carbonate is propylene carbonate.

7. A method according to claim 1 wherein the alkylene carbonate is ethylene carbonate.

8. A method according to claim 1 wherein the soluble adduct is a reaction complex of triethylene diamine and propylene carbonate.

9. A meth according to claim 1 wherein the adduct is formed by reacting and aging the tertiary amine and cyclic alkylene carbonate for a time sufficient to form an effective catalytic concentration of the adduct.

10. A method according to claim 1 wherein the streams of the polyisocyanurate reaction mixture are reaction injection molded into glass fibre mats.

* * * * *